(12) United States Patent
Yuan et al.

(10) Patent No.: US 11,620,394 B2
(45) Date of Patent: Apr. 4, 2023

(54) ALLOCATING MULTIPLE DATABASE ACCESS TOKENS TO A SINGLE USER

(71) Applicant: International Business Machines Corporation, Armonk, NY (US)

(72) Inventors: Yuan Yuan, Beijing (CN); Xiao Ling Chen, Beijing (CN); Xiao Yang Li, Beijing (CN); Qun Wei, Beijing (CN); Hong Liang Zhao, Beijing (CN); Yu Fang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 339 days.

(21) Appl. No.: 17/129,994

(22) Filed: Dec. 22, 2020

(65) Prior Publication Data
US 2022/0198031 A1    Jun. 23, 2022

(51) Int. Cl.
*G06F 21/60* (2013.01)
*G06F 21/31* (2013.01)
*G06F 21/62* (2013.01)
*G06F 11/36* (2006.01)

(52) U.S. Cl.
CPC ............ *G06F 21/604* (2013.01); *G06F 21/31* (2013.01); *G06F 21/6209* (2013.01); *G06F 11/3668* (2013.01)

(58) Field of Classification Search
CPC .... G06F 21/604; G06F 21/31; G06F 21/6209; G06F 11/3668
See application file for complete search history.

(56) References Cited

U.S. PATENT DOCUMENTS

| 6,308,274 B1 * | 10/2001 | Swift .................... G06F 21/604 710/200 |
| 6,978,381 B1 * | 12/2005 | Te ....................... G06F 21/6218 705/54 |
| 8,793,509 B1 | 7/2014 | Nelson |
| 8,842,815 B2 * | 9/2014 | Connelly ............ H04L 65/1036 379/219 |
| 10,666,657 B1 | 5/2020 | Threlkeld |
| 2004/0199643 A1 * | 10/2004 | Thompson ............ G06F 9/5055 709/227 |
| 2006/0168653 A1 * | 7/2006 | Contrera ................. G06F 21/34 726/9 |
| 2009/0320119 A1 * | 12/2009 | Hicks ..................... G06Q 10/10 707/999.1 |
| 2010/0111087 A1 * | 5/2010 | Lindgren .............. H04L 61/106 370/392 |

(Continued)

FOREIGN PATENT DOCUMENTS

CN            101499906 A        8/2009

*Primary Examiner* — Vance M Little
(74) *Attorney, Agent, or Firm* — David B. Woycechowsky (57) ABSTRACT

A computer-implemented method for use with a database computer system including a database data set that includes machine readable data in the form of a plurality of records, the computer-implemented method comprising: (i) defining a plurality of sets of permission rule(s); (ii) receiving a first user profile for a first user; (iii) establishing a plurality of user identities to the first user; (iv) generating a plurality of tokens; and (v) for each given user identity of the first user, adding a given token of the plurality of tokens to the first user profile and associating the given user identity and the given token.

18 Claims, 6 Drawing Sheets

(56) References Cited

U.S. PATENT DOCUMENTS

| | | | |
|---|---|---|---|
| 2013/0298202 A1* | 11/2013 | Warshavsky | H04L 69/24 |
| | | | 726/4 |
| 2015/0089597 A1 | 3/2015 | Srinivasan | |
| 2016/0063270 A1* | 3/2016 | Brock | G06F 21/6218 |
| | | | 726/28 |
| 2017/0054726 A1* | 2/2017 | Friedmann | G06Q 30/0283 |
| 2020/0053091 A1 | 2/2020 | Childress | |
| 2020/0127994 A1 | 4/2020 | Kukreja | |

* cited by examiner

```
SCREEN SHOT DISPLAY GENERATED BY A COMPUTER

ENTER USERNAME: DEVELOPER A
SUBMIT TO RETINAL SCAN...SUCCESS
YOU ARE NOW LOGGED IN AS DEVELOPER A, NO TTI
ENTER A COMMAND: SWITCH TO TTI#1
ENTER A COMMAND: DELETE RECORD 108c
ACCESS DENIED: RECORD 108c IS FLAGGED CONFIDENTIAL
ENTER A COMMAND: SWITCH TO TTI#2
ENTER A COMMAND: DELETE RECORD 108c
ACCESS GRANTED, RECORD 108c HAS BEEN DELETED
ENTER A COMMAND: DELETE RECORD 108m
ACCESS GRANTED, RECORD 108m HAS BEEN DELETED
ENTER A COMMAND: DELETE RECORD 108y
ACCESS DENIED: YOUR TOKEN IS EXHAUSTED
ENTER A COMMAND: SWITCH TO BASIC ACCOUNT
ENTER A COMMAND: DELETE RECORD 108y
ACCESS GRANTED, RECORD 108y HAS BEEN DELETED
```

ALLOCATING MULTIPLE DATABASE ACCESS TOKENS TO A SINGLE USER

BACKGROUND

The present invention relates generally to the field of software testing, and more particularly to software testing of computer programs that include for access rights, for respective user entities, that define the access permissions available to the user when using the computer program.

"Access tokens" are a known mechanism used to control access to data, type of access to data and/or degree of access to data. "Session tokens" should not be confused with "access tokens," which are a fundamentally different thing. An access token is a system object that represents the subject of access control operations which is used in computer systems. "Tokens," as that term is used herein, means access tokens and not session tokens.

SUMMARY

According to an aspect of the present invention, there is a method, computer program product and/or system for use with a database computer system including a database data set that includes machine readable data in the form of a plurality of records that performs the following operations (not necessarily in the following order): (i) defines a plurality of sets of permission rule(s), with each set of permission rule(s) reflecting a different combination of privileges with respect to data of the database data set; (ii) receives a first user profile for a first user; (iii) establishes a plurality of user identities to the first user; (iv) generates a plurality of tokens, with each token being formed and structured to provide access according to a respectively corresponding set of permission rule(s) of the plurality of sets of permission rule(s); and (v) for each given user identity of the first user, adds a given token of the plurality of tokens to the first user profile and associating the given user identity and the given token.

DETAILED DESCRIPTION

Traditionally, users are granted access to computer resources (for example, access to confidential data stored in a database) by sending a token to a device of an authorized, with the user's level of authorization being determined by the content of the token the user receives. Typically, the user can use the token repeatedly to achieve the types and/or levels of access for which the user is authorized. On the other hand, in some embodiments of the present invention, a user is granted with multiple tokens with each token specifying a different set of level(s) and/or type(s) of permission(s) with respect to the use of computer resource(s). As will be discussed below, some of these tokens may be "one time use only tokens" or "X number of uses only tokens" because the need to test at different levels is a temporary phase that typically ends when testing is done and the computer system goes into production. More specifically, in some embodiments, the way of token authorization provides a method to generate several tokens for a same user and every token is characterized by allowing only a limited number of access operations (for example, only one access operation) using the token. In these embodiments with one time use only tokens, each access of user will exhaust the token so that the access granted to a "user identity" corresponding to the token cannot be repeated. This Detailed Description section is divided into the following subsections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product at any possible technical detail level of integration. The computer program product may include a computer readable storage medium (or media) having computer readable program instructions thereon for causing a processor to carry out aspects of the present invention. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

A "storage device" is hereby defined to be anything made or adapted to store computer code in a manner so that the computer code can be accessed by a computer processor. A storage device typically includes a storage medium, which is the material in, or on, which the data of the computer code is stored. A single "storage device" may have: (i) multiple discrete portions that are spaced apart, or distributed (for example, a set of six solid state storage devices respectively located in six laptop computers that collectively store a single computer program); and/or (ii) may use multiple storage media (for example, a set of computer code that is partially stored in as magnetic domains in a computer's non-volatile storage and partially stored in a set of semiconductor switches in the computer's volatile memory). The term "storage medium" should be construed to cover situations where multiple different types of storage media are used.

Computer readable program instructions described herein can be downloaded to respective computing/processing devices from a computer readable storage medium or to an external computer or external storage device via a network, for example, the internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
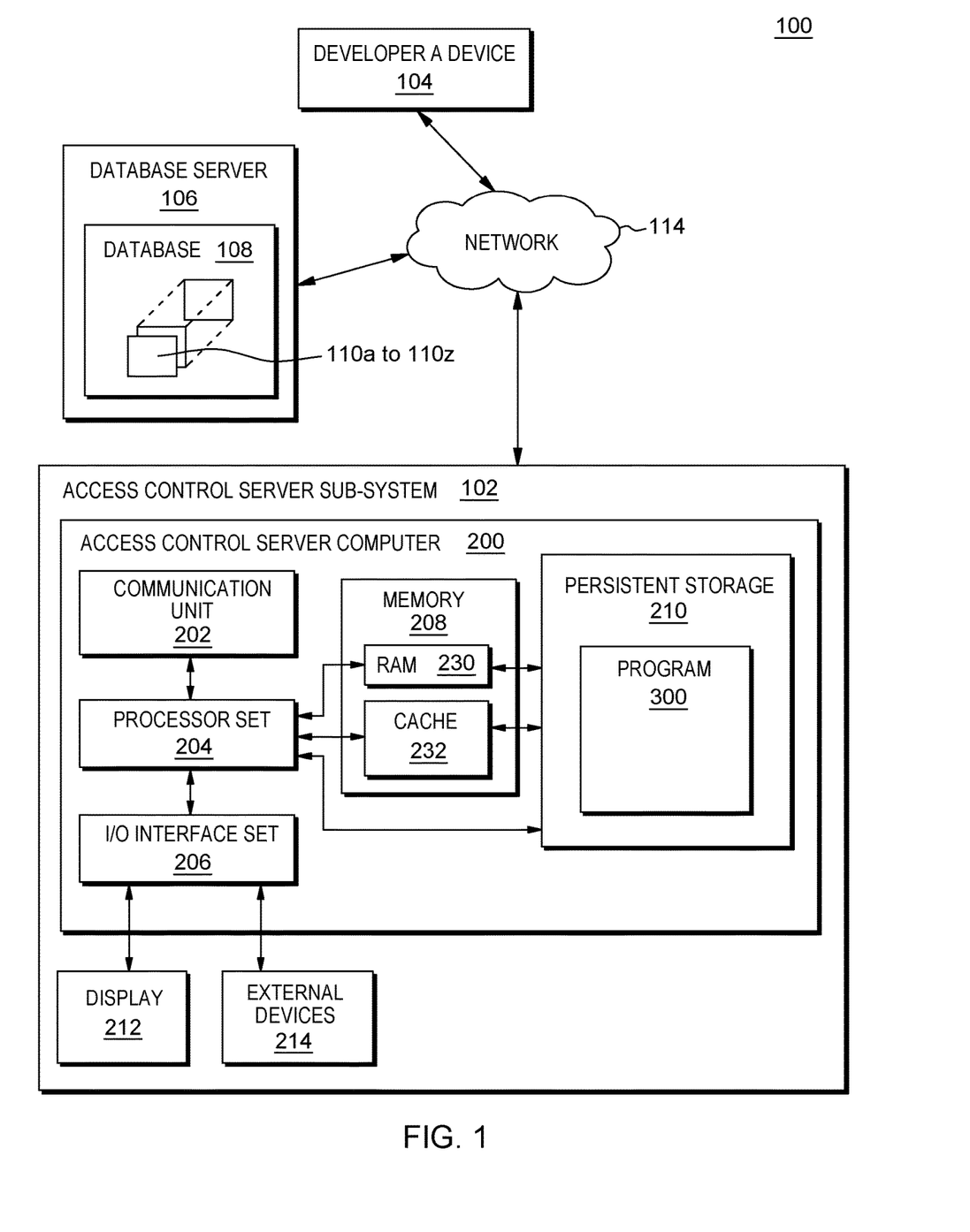
FIG. 1 is a block diagram of a first embodiment of a system according to the present invention.

As shown in FIG. 1, networked computers system 100 is an embodiment of a hardware and software environment for use with various embodiments of the present invention. Networked computers system 100 includes: access control server subsystem 102 (sometimes herein referred to, more simply, as subsystem 102); developer device 104; database server 106 (including database data set 108 and multiple records 110a to 110z); and communication network 114. Server subsystem 102 includes: access control server computer 200; communication unit 202; processor set 204; input/output (I/O) interface set 206; memory 208; persistent storage 210; display 212; external device(s) 214; random access memory (RAM) 230; cache 232; and program 300.

Subsystem 102 may be a laptop computer, tablet computer, netbook computer, personal computer (PC), a desktop computer, a personal digital assistant (PDA), a smart phone, or any other type of computer (see definition of "computer" in Definitions section, below). Program 300 is a collection of machine readable instructions and/or data that is used to create, manage and control certain software functions that will be discussed in detail, below, in the Example Embodiment subsection of this Detailed Description section.

Subsystem 102 is capable of communicating with other computer subsystems via communication network 114. Network 114 can be, for example, a local area network (LAN), a wide area network (WAN) such as the internet, or a combination of the two, and can include wired, wireless, or fiber optic connections. In general, network 114 can be any combination of connections and protocols that will support communications between server and client subsystems.

Subsystem 102 is shown as a block diagram with many double arrows. These double arrows (no separate reference numerals) represent a communications fabric, which provides communications between various components of subsystem 102. This communications fabric can be implemented with any architecture designed for passing data and/or control information between processors (such as microprocessors, communications and network processors, etc.), system memory, peripheral devices, and any other hardware components within a computer system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for subsystem 102; and/or (ii) devices external to subsystem 102 may be able to provide memory for subsystem 102. Both memory 208 and persistent storage 210: (i) store data in a manner that is less transient than a signal in transit; and (ii) store data on a tangible medium (such as magnetic or optical domains). In this embodiment, memory 208 is volatile storage, while persistent storage 210 provides nonvolatile storage. The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202 provides for communications with other data processing systems or devices external to subsystem 102. In these examples, communications unit 202 includes one or more network interface cards. Communications unit 202 may provide communications through the use of either or both physical and wireless communications links. Any software modules discussed herein may be downloaded to a persistent storage device (such as persistent storage 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. I/O interface set 206 also connects in data communication with display 212. Display 212 is a display device that provides a mechanism to display data to a user and may be, for example, a computer monitor or a smart phone display screen.

In this embodiment, program 300 is stored in persistent storage 210 for access and/or execution by one or more computer processors of processor set 204, usually through one or more memories of memory 208. It will be understood by those of skill in the art that program 300 may be stored in a more highly distributed manner during its run time and/or when it is not running. Program 300 may include both machine readable and performable instructions and/or substantive data (that is, the type of data stored in a database).

In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
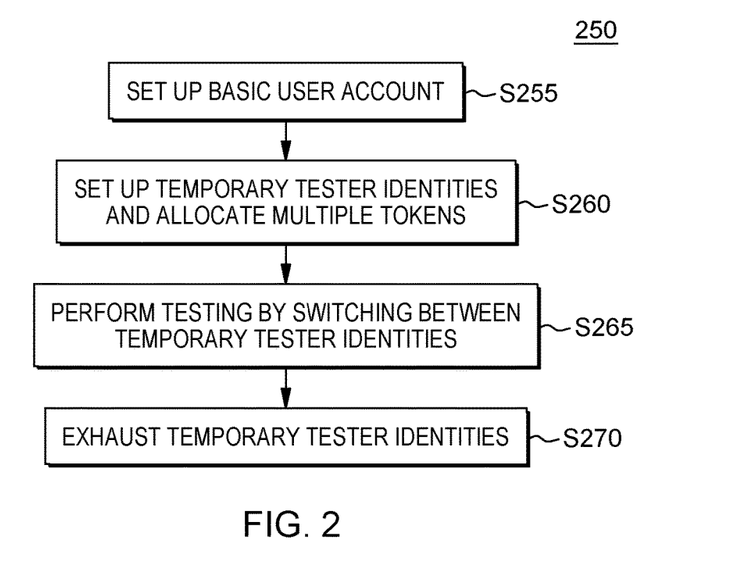
FIG. 2 is a flow chart showing a first embodiment method performed, at least in part, by the first embodiment system.
Figure 3:
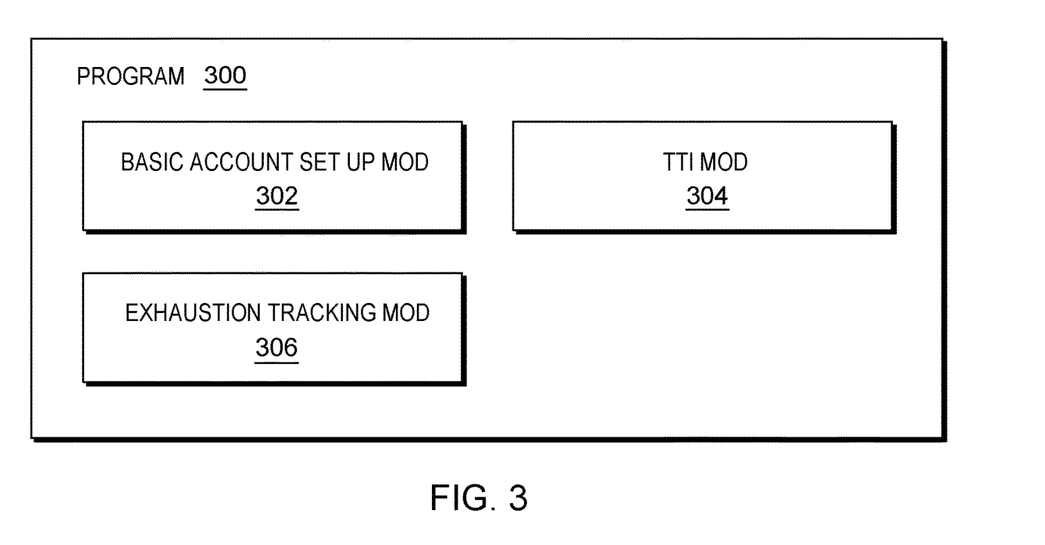
FIG. 3 is a block diagram showing a machine logic (for example, software) portion of the first embodiment system.

As shown in FIG. 1, networked computers system 100 is an environment in which an example method according to the present invention can be performed. As shown in FIG. 2, flowchart 250 shows an example method according to the present invention. As shown in FIG. 3, program 300 performs or controls performance of at least some of the method operations of flowchart 250. This method and associated software will now be discussed, over the course of the following paragraphs, with extensive reference to the blocks of FIGS. 1, 2 and 3.

Processing begins at operation S255, where basic account set up module ("mod") 302 sets up a "basic account" for developer A who performs computer technology development (for example, software development) using developer A device 104. The basic account is an account that allows developer A to authenticate in order to have access to database data set 108 (sometimes more simply referred to as "database"). In some embodiments, setting up a basic account for a developer may involve giving developer A device 104 an access token that allows each and every type of access to the database. This operation is what happens under currently conventional technology when a developer registers and establishes a user account to access a database, and it is also the starting point for many embodiments of the present invention.

Processing proceeds to operation S260, where temporary tester identities (TTI) mod 304 sets up one or more temporary tester identities for developer A's basic user account and allocates tokens to developer A's multiple user profiles. More specifically, in this example, developer A ends up with three (3) user identities as follows: (i) the default user identity of the basic account (in this example called "BASIC ACCOUNT"); (ii) a first TTI (in this example called TTI #1); and (iii) a first TTI (in this example called TTI #1).

These three (3) respective user identities for developer A are allocated the following tokens: (i) BASIC ACCOUNT gets a token of a first type which allows unlimited use; (ii)

TTI #1 gets a token of a second type which can be used only once; and (iii) TTI #2 gets a token of a third type which can only be used twice. These three tokens differ not only in the number of times that they can be used, but also differ with respect to the types of permission allowed by the respective token types, as will be discussed in the next paragraph.

In various embodiments of the present invention, different types of tokens enable, for the user, different type(s) of access permission with respect to database 108. This means that BASIC USER, TTI #1 and TTI #2 will each have permissions to do somewhat different things. In this example, the three types of tokens not only come with different permissions, but also allow a different number of uses (which is not the same thing as a "different set of access permissions"). In other embodiments, there are different sets of access permissions for each token type, even though all tokens can be used the same number of times. Furthermore, in this example, the different access permissions are as follows: (i) first token type (BASIC USER) permits full read write and/or revision access to all records in database 108, whether they are flagged as "confidential" or not; (ii) second token type (TTI #1) only permits full read write and/or revision access to all records in database 108 that are not flagged as "confidential;" and (iii) third token type (TTI #2) only permits full read write and/or revision access to all records in database 108 that are flagged as "confidential."

In various embodiments of the present invention, the permissions given and withheld may depend upon different features of the access. A non-exclusive list of access characteristics that define and distinguish different sets of permission rules for different token types follows: (i) different level of read access (if any), (ii) different level of write access (if any); (iii) different level of ability to delete data of the database data set, (iv) different level of ability to revise data of the records of the database data set, (v) different level of ability to add data to existing records of the database data set, (vi) different level of ability to add new records of the database data set, and/or (vii) different levels of one or more of the foregoing types of access with respect to different records of the database data set, and/or (viii) different levels of one or more of the foregoing types of access with respect to different fields of the records of the database data set. Regardless of exactly how the different access permission sets are different from each other, the typical objective is to simulate runtime (that is, not developer) users who have a set of permissions to do some kinds of database data access and not others. In this way, in many embodiments, the permission sets granted to later runtime users of various types will effectively dictate what permission sets, user identities and/or token types are allocated to a given developer for her development work. This, of course, will vary depending on the specifics of the database and/or the interface for accessing the data of the database.

Processing proceeds to operation S265, where developer A uses developer A device 104 to make various changes to the data of records 110a to 110z as part of her development work. More specifically, developer A can switch among and between her multiple user identities, and respectively associated access tokens, as part of her development work, which typically takes the form of testing the database computers system to see whether it works as intended. Processing proceeds to operation S270, where exhaustion tracking mod 306 exhausts the various user identities of developer A according to the usage limits on the respective tokens (that is, in this example, no exhaustion for BASIC USER, exhaustion after one use for TTI #1 and exhaustion after two (2) uses for TTI #2.

Figure 4:
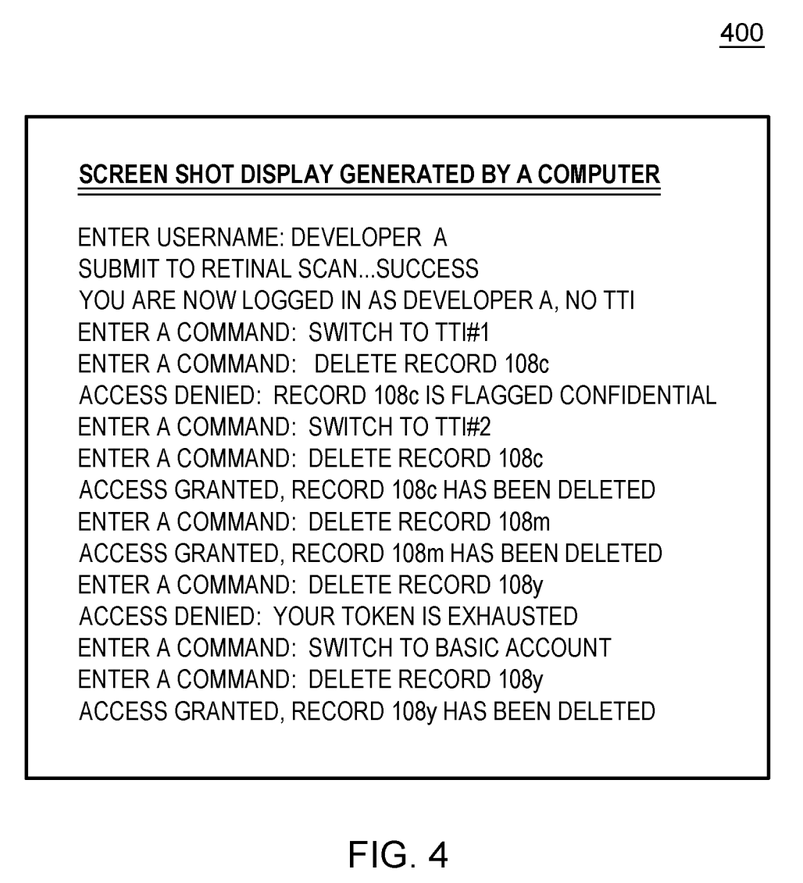
FIG. 4 is a screenshot view generated by the first embodiment system.

Screenshot 400 of FIG. 4 shows how operation S265 may work out in practice. While this screenshot is probably largely self-explanatory, some explanation will be provided here. First the user logs into the session by authenticating herself. In this example, the authentication is based primarily on a retinal scan (as opposed to, say, a password), and will start the user's session with the database. It is noted that after this initial log in and authentication, developer A does not need to re-authenticate as she switches between various user identities, associated tokens and associated permission sets—this is an advantage of some embodiments of the present invention. Developer A switches to TTI #1 to try to delete a row, but this does not work because the second token type, associated with TTI #1, is flagged as confidential, such that access is denied under the second token type. In response, developer A switches to TTI #2 and deletes a couple of confidential records from the database as part of her development work. Developer tries to delete a third confidential record using TTI #2 and the third token type token, but exhaustion tracking mod 306 determines that the TTI #2 token has been exhausted by the two (2) previous accesses (that is, record deletions). In response, developer A switches to user identity BASIC USER and deletes the third confidential record from database 108.

III. Further Comments and/or Embodiments

Some embodiments of the present invention recognize one, or more, of the following facts, potential problems and/or potential areas for improvement with respect to the current state of the art: (i) when performing user authorization during development and testing of new applications that are still under development, there is a need to prepare a lot of distinct user entities (herein referred to as users) with different access rights such as: (i) Read/Write/Execute/None; (ii) currently, testers need create different users (userA/userB/userC/and so on) and then logon and logout using various ones of the user entities over time in order to perform the user access right testing work; (iii) when such testing is done, there is a need to remove the user entities that were created only for computer program development purposes; (iv) a tester typically can't use one id (User) to do the different user access right testing work; (v) a token is a string defined by a user and saved in backend; (vi) the token is the key used by a server to filtrate users once username and password passed the authorization; (vii) because only the client and the server are aware of this string, the server is in a position to reliably determine whether authorization requests come from a given authorized client or not; (viii) the existing token generating mechanism will only provide one token per user entity; and/or (ix) when a user has passed successfully through an authorization procedure, the server typically generates this token according to relevant information about the user entity.

A statement of a problem will now be discussed. Currently, when developers and testers do the user authorization during development and testing of application, they need to prepare a lot of separated users with different access rights. After different users are created, testers and developers need log on and logout with different users to do the user access testing work. Lastly, when the testing is done, all created users according to this process need to be removed. The quality and efficiency of all of these works are too independent to the capability of testers or developers. This problem may be addressed by a token that specifies one of two different types of user entity. One type of entity is the client user which has the highest authorization and used to figure out all authorizations for all resources. The other type of identity is the mapped user which could be temporary generated user or existing user which has a single authorization and is used to figure out the expected authorization for resources to test. A server will do both checks for these two types of users and return the resource according to the checks. With such a way, there may be different tokens for the same user.

A statement of a solution will now be discussed. Some embodiments of the present invention provide an innovative method, which reduces repeated actions like login/logout with different users during web software development or testing by generating multiple temporary users with corresponding single authorization token or mapping the tokens to existing real users which have same or most matched single permission without creating temporary uses. By combining the Dichotomy algorithm, some methods according to the present invention separate every single access to resources from users' authorization by determining and mapping to users has a single access or generating new users has a single access. The authorization will be passed for a token by taking considering in both current login user and mapping users which could be generated or pre-existing users and have single access to resources. By this way, the development and testing of web application will greatly be accelerated.

Some technical points are as follows: (i) backends create multiple temporary users which correspond to single authorized token instead of taking repeated actions like login/logout multiple times according to client user access permission, in which the highest permission is same as client user and the lowest permission is none; (ii) with combining the Dichotomy algorithm way, some embodiments determine the mapping way is mapping to existing real users with single authorization, or mapping to new temporary users; (iii) backends determine whether a token authorization passes or not by checking not only client user but also mapping users; (iv) as the mapping users are selected at first and only have one certain authorization, the token will only have this certain authorization, like read authorization; and/or (v) backends delete generated temporary users or remove the mapping relationship that existed in users when client user takes logout action or other scenarios leading to a token being invalid.

Some embodiments of the present invention may include one, or more, of the following operations, features, characteristics and/or advantages: (i) a method of different authorization for a same use; (ii) a smart method, which reduces repeating actions like login/logout with different users during web software development or test; (iii) generates multiple temporary users with corresponding single authority token or mapping the tokens to exited real users which have an identical, or closely matching, authorization profile; (iv) avoids creating temporary user(s); (v) separates every resource access right to access resources from users' authorization by: (a) granting existing users a single access permission, or (b) generating a new user entity which is granted a single access permission; (vi) passes authorization for a token by considering both the current login user and mapping users which could be generated or existing users; (vii) a convenient and efficient method to decrease repetition of login/logout actions by several users with different permissions; and/or (viii) potentially accelerates the development and test of a computer program (such as a web application) that includes computer code implementing and/or controlling user entity authorizations and associated access rights.

Some embodiments of the present invention may include one, or more, of the following operations, features, characteristics and/or advantages: (i) reduces repeating actions like login/logout taken by several client users with different permission during web software development or test by generating multiple temporary users with single or combination corresponding authority token; (ii) creates multiple temporary users which correspond to single authority token instead of taking repeating actions like login/logout multiple times according to client user access permission; (iii) the highest level of permissions for various access rights is the same as a client user and the lowest of permission is "no permissions;" (iv) machine logic according to the present invention maps a client user to existing real users with single authority (that is, for a certain authority, if number of resources of which an existing user has and only has this single certain authority is more than half of which the client user has, and compared to other existing users, this existing user has biggest number of same authorization with client, flags both in client user and this existing user will be set to mark the mapping; (v) passes token authorization by checking not only client user but also mapping users; (vi) as the mapping users are selected at first and only have one certain authorization, the token will only have this certain authorization, like read authorization; and/or (vii) deletes generated temporary users or removes the mapping to an existing real user when client user takes logout action.

As an example of different permission types and/or permission levels respectively associated with different user entities, assume a User U5 who has Execute, Write and Read permissions. If the system has had no other users prior to the creation of U5, then machine logic according to the present invention will create temporary user entities as follows: (i) U1 with Execute permission; (ii) U2 with Write permission; (iii) U3 with Read permission; and (iv) U4 with no permissions.

Some embodiments of the present invention may include one, or more, of the following operations, features, characteristics and/or advantages: (i) implementation of two styles of tokens for two corresponding styles of users: (a) one is the client user which has the highest authorization and is used to figure out all authorizations for all resources, and the other is the temp generated user or the mapped user which has a single authorization and used to figure out the expected authorization for resources to test; (ii) server will do both checks for these two style users and will return the resource if the checks come out favorably and/or to the extent permitted by the results of the checks; and/or (iii) with such a mechanism, there can be different tokens for the same human individual.

Some embodiments of the present invention may include one, or more, of the following operations, features, characteristics and/or advantages: (i) reduces repeating actions like login/logout taken by several client users with different permission during web software development or test by generating multiple temporary users with single corresponding authority token; (ii) creates multiple temporary users which correspond to single authority token instead of taking repeating actions like login/logout multiple times according to client user access permission, in which the highest permission is same as client user and the lowest permission is none; (iii) determines the mapping way is mapping to existed real users with single authority, or, mapping to new temp users; (iv) for example, for a certain authority, if number of resources of which an existing user has and only has this single certain authority is more than half of which the client user has, and compared to other existing users, this existing user has biggest number of same authorization with client, flags both in client user and this existing user will be set to mark the mapping; (v) passes token authorization by checking not only client user but also mapping users; (vi) as the mapping users are selected at first and only have one certain authorization, the token will only have this certain authorization, like read authorization; and/or (vii) deletes generated temporary users or removes the mapping relationship existed in users when client user takes logout action or other scenarios lead to invalid token(s).

Figure 5:
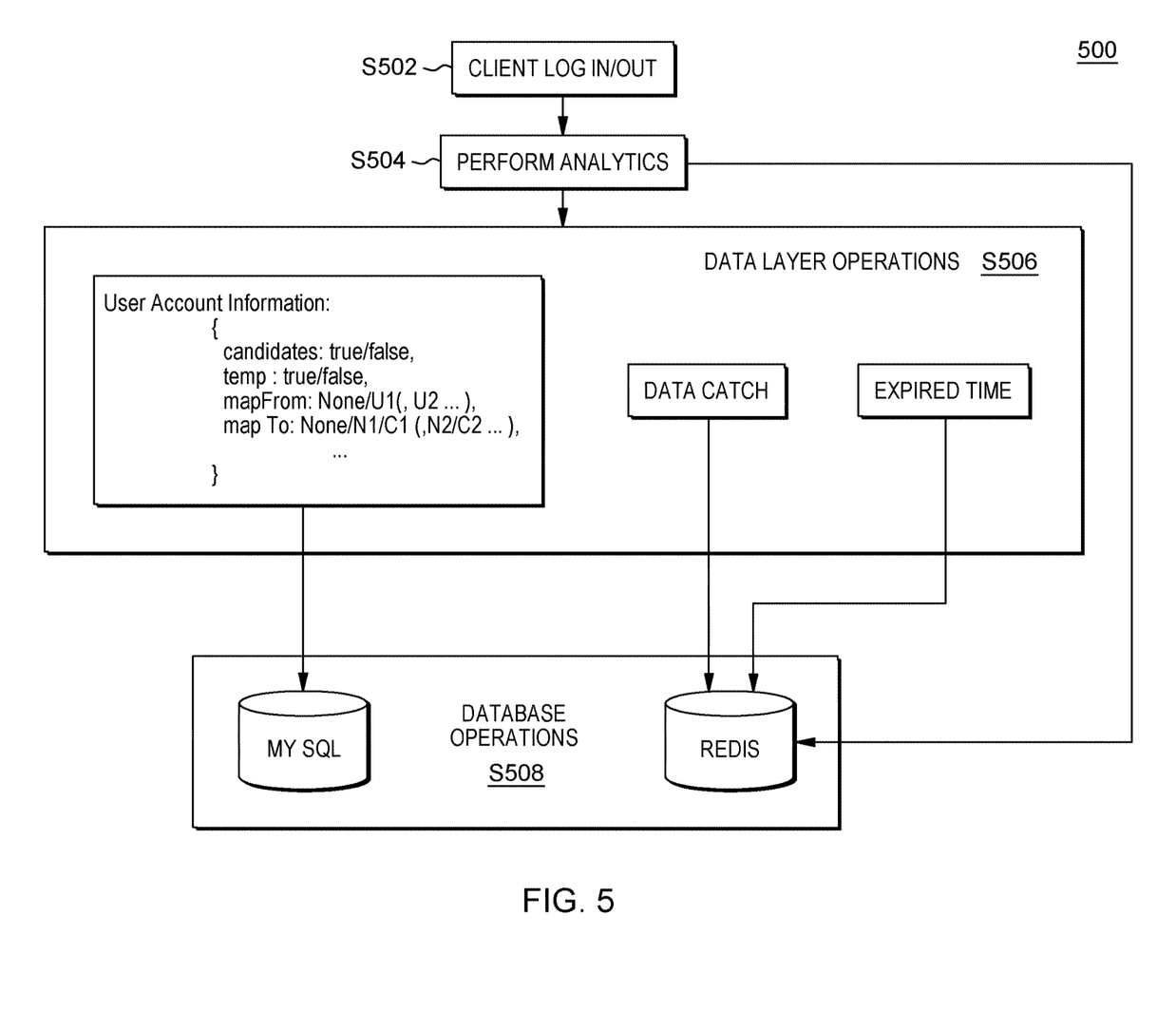
FIG. 5 is a flowchart showing a second embodiment of a method according to the present invention.
Figure 6:
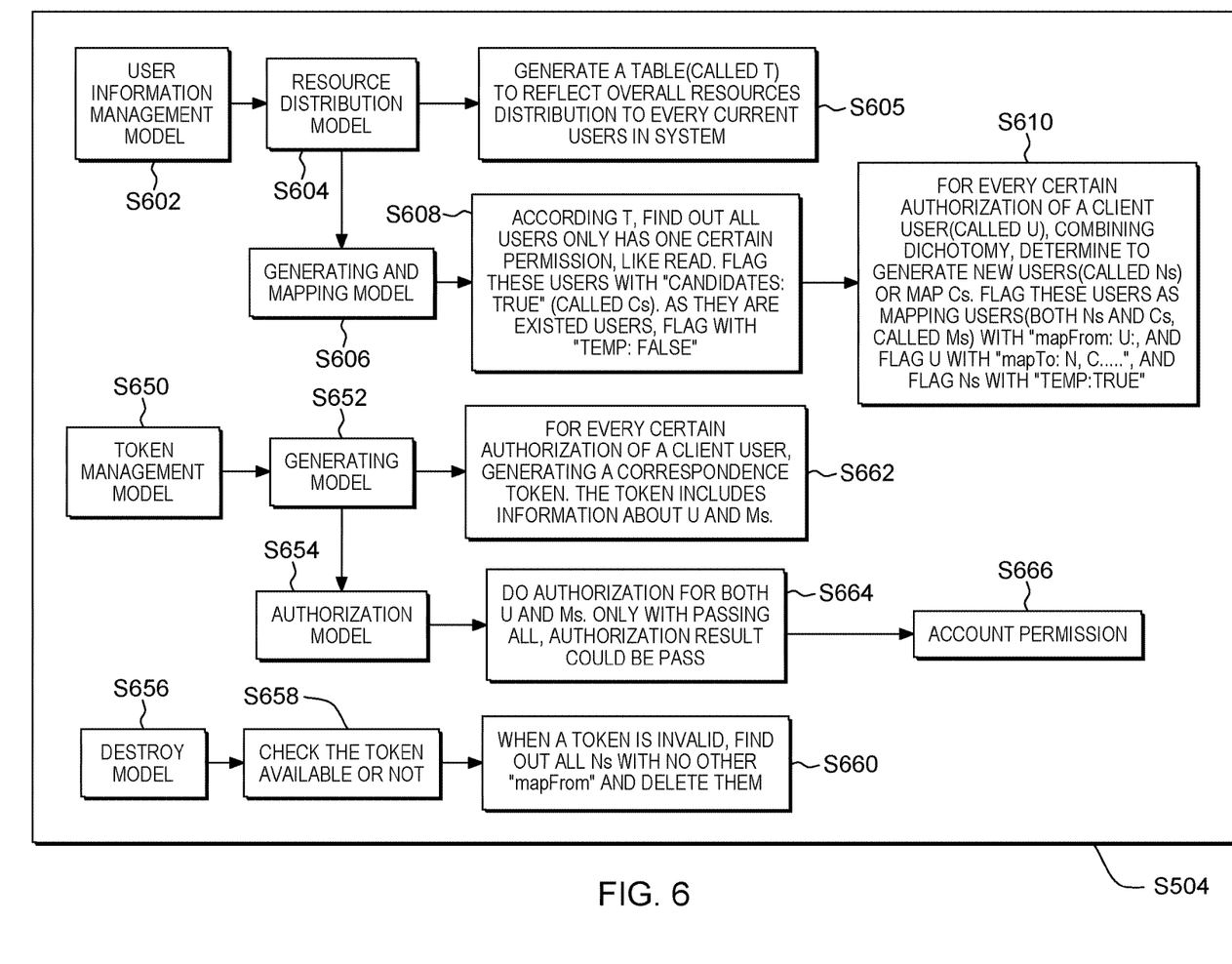
FIG. 6 is a detail level flow chart of one of the operations of the second embodiment method.

FIGS. 5 and 6 collectively make up a flowchart 500 that defines a method according to an embodiment of the present invention. Under the method, processing begins with operation S502 which is a client login, or logout operation. Processing proceeds to operation S504 where analytics are performed on data obtained through the client login information and/or third party data obtainable using the client login information. Operation S504 will be discussed in more detail in the next paragraph. In a parallel process flow of the method of flowchart 500, Operation S506 is a set of data layer operations, such as user account information operation, data catch operation and expired time operation (these data flow operations do not have separate reference numerals in FIG. 5). Processing proceeds to operation S508 where the database operations are performed, including operations on a MySQL database and a Reddis style database (these databases do not have separate reference numerals in FIG. 5).

Operation S504 will now be broken up into a series of sub-operations as shown within the borders of block S504 as it appears in FIG. 6. As shown in FIG. 6, operation S504 includes the following sub-operations, with process flow among and between the sub-operations being shown by arrows: S602; S604; S606; S608; S605; S610; S650; S652; S654; S656; S658; S660; S662; S664; and S666.

Figure 7:
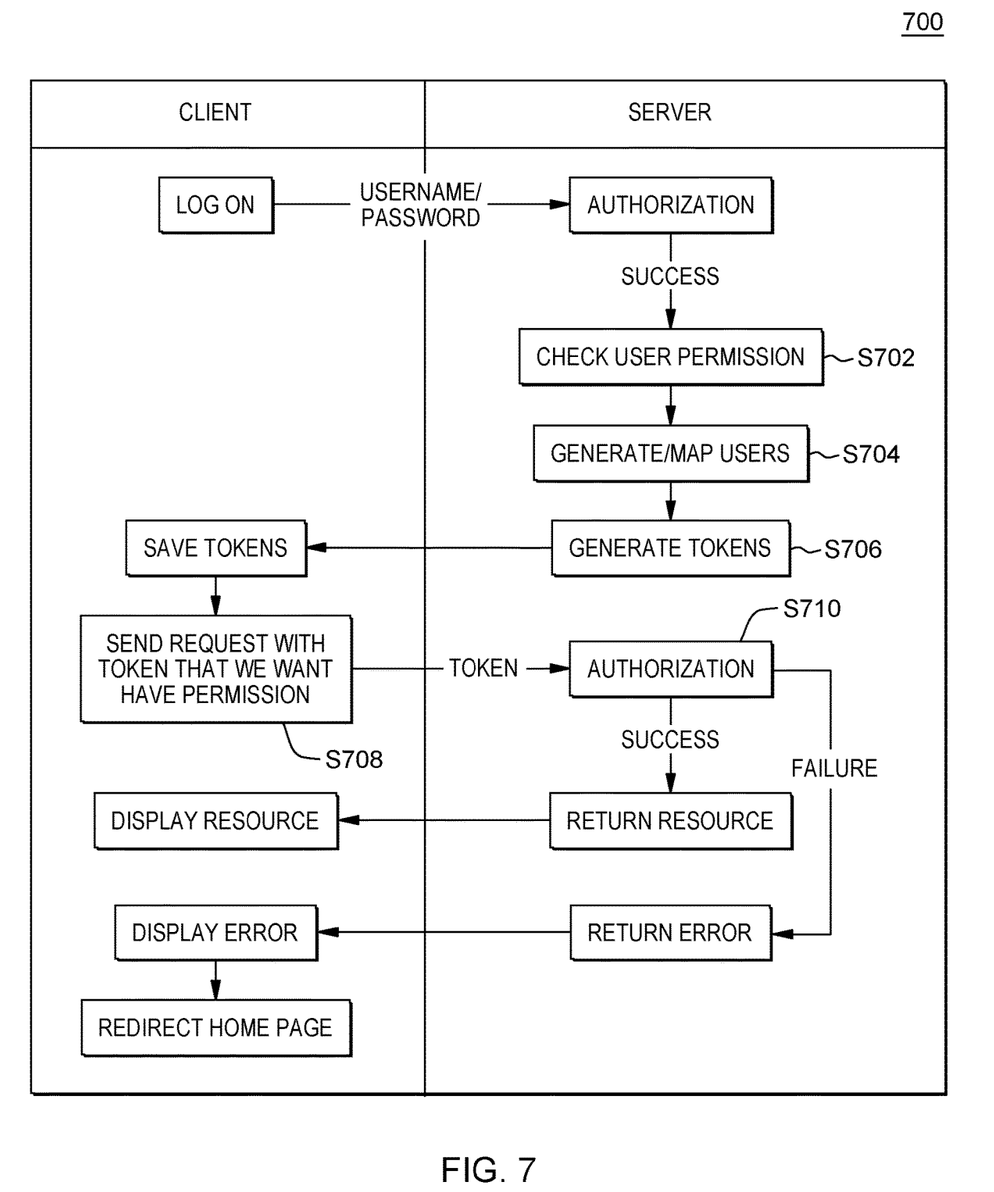
FIG. 7 is a flow chart showing a third embodiment of a method according to the present invention.

As shown in FIG. 7, flowchart 700 represents a method for client login and associated resource access (or denial of the same, in some cases). The method of flowchart 700 includes five (5) operations of interest for present purposes, as follows: S702; S704; S706; S708; and S710. These five (5) operations of interest will be respectively discussed in the following five (5) paragraphs.

OPERATION S702: At this operation, a user, who, in this example, has Execute, Write and Read permission, inputs her username and password into her device in order to communicate with the server side in performing authentication.

OPERATION S704: Based on overall resources distribution table, find out a C1 in class C that has the largest number of common resources (that is, in common with the user) for a certain single authorization, for example, an authorization to read. To reduce the consumption of computer system resources, and combined with the idea of the Dichotomy algorithm, if the number is bigger than half of the total number of the read authorization for the user, then the machine logic maps the user to C1, and continues to perform a process for remaining resources until the number is not bigger than half. On condition that the number is not bigger than half of the total number of the read authorization for the user, the machine logic: (i) maps the user to C1; and (ii) generates a value called N1 with read authorization for left resources and map the user to N1.

OPERATION S706: Based on data associated with the user, C1 and N1, a token is generated. The generated token is called token1, for read authorization. A similar process is used to generate further tokens as follows: token2, token3 and token4, for write, execute and no authorization.

OPERATION S708: the user sends request to server with different tokens, as follows: (i) Use token1 to send request with Read permission; (ii) Use token2 to send request with Write permission; (iii) Use token3 to send request with Execute permission; (iv) Use token4 to send request with No permission; and (v) Use multiple tokens to send request.

OPERATION S710: Check the request resource authorization for the user, C1 and N1, when the user and C1, or N1, pass the authorization, the authorization result could be success. Check U to avoid the case that the results present a false positive when C1 has the authorization, but the user does not have authorization. At operation S710, the machine logic is structured and/or programmed to check C1/N1 to make sure the token has only read authorization.

Some embodiments of the present invention involve methods that have a further operation which will now be discussed in this paragraph. When the user logs out, all four (4) tokens are expired. In response, the machine logic performs checks for all users involved in a "mapTo" function of the user. In the case of C1, the machine logic removes the user from its "falgFrom". In the case of N1 where its "flagFrom" only involves the user, the machine logic is structured and/or programmed to delete N1. In the case that N1 and its "flagFrom" not only involve the user, but, further involve others, then the machine logic is structured and/or programmed to remove the user from its "flagFrom".

Code embodying an algorithm for mapping/generating users with the Dichotomy algorithm is set forth as follows:

```
user = all users in system;
Nresource = total number of resources;
{Resources} indicates universal set of resources in system;
WHILE(user! =NULL) {
UWN = user.getUserName( );
NWN = user.getResourcesNumber( ) }
userObj = {UWN :NWN}
IF ((user has read && ! user has written && ! user has execution)
THEN
Single[R].add(userObj);
ELSE IF (! user has read && user has written && ! user has execution)
THEN
Single[W].add(userObj);
ELSE IF ((! user has read && ! user has written && user has execution)
THEN
Single[E ].add(userObj);
user ->next;
}
```

Taking written access as an example for showing how the foregoing code may be applied:

```
WHILE({Resources}! = φ ) {
Bubble sort for NWN , which calculates {Resources}, in Single[W] in
descending order;
NWMax = NW1 ;
IF(NWMax > Nresource /2 )
THEN{
Add UWMax to user group prepare to map;
Nresource =– NWMax ;
{Resources} =– {Resources accessed by User who has UwMax}
} ELSE {
Generate new user UWNew who has access for {Resources}
;
Add UWNew to user group prepare to map;
Nresource = 0;
```

```
{Resources} = φ
}
```

The algorithm corresponding to the foregoing computer code will now be set forth in the form of a natural language explanation. The algorithm has five (5) operations, which will be respectively set forth in the following paragraphs.

OPERATION 1: Includes determining the identities of all users that exist in the system who have "single access right," such as read only, write only and execute only.

OPERATION 2: Includes determining the total number of resources, Nresource. R1, R2, R3 . . . RN represent N resources.

OPERATION 3: includes storing identities and information relating to single access right users in an array data structure, such as the following:

```
Single[W] = [{UW1 :NW1} , {UW2 :NW2} , { UW3 :NW3} , ... , {UWN :NWN}]
Single[R] = [{UR1 :NR1} , {UR2 :NR2} , { UR3 :NR3} , ... , {URN :NRN}]
Single[E] = [{UE1 :NE1} , {UE2 :NE2} , { UE3 :NE3} , ... , {UEN :NEN}]
```

NWN means total numbers of resources the write only user UWN have access. NRN means total numbers of resources the read only user URN have access. NEN means total numbers of resources the execute only user UEN have access.

OPERATION 4: Includes combining the design logic used by the Dichotomy algorithm and generating new temperate users according requirement and generate mapping relationships between customer use and new/exist users. Take Single[W] for example that uses the following computer code:

```
if({Resources} != φ) {
Bubble sort Single[W] and find out the biggest number NWMax of
{Resources};
If(NWMax > Nresource /2 ) {
Add UWMax to user group prepare to map;
Nresource =– NWMax ;
{Resources} =– {Resources accessed by User who has UwMax}
}
else {
Generate new user UWNew who has access for {Resources}
;
Add UWNew to user group prepare to map;
Nresource = 0;
{Resources} = φ
}
}
```

OPERATION 5: According to customer user and users in group prepare to map, this operation includes: (i) generating tokens with write access only for step 4. For example, if there are 3 times UWMax could be found, with C1 and C2 and C3, satisfying the constraint of NWMax>Nresource/2; and (ii) generating a UWNew, N, for left resources, the machine logic of the computer system will. According to these 5 users, which could be classed to two types, one is mapped from user and the other is mapped to user, in order to generate a token with write access for customer user.

A JSON Web Token example will now be set forth in order to illustrate how methods according to the present invention can generate token with two (2) users which is different with existed one, using one of the currently conventional authorization mechanisms (or a mechanism to be developed in the future). What this means is that currently conventional token mechanisms will generate a token only based upon information for a single user. In some embodiments, the software will use two different user types to generate one token as follows: (i) one user type is a customer type user which is the real log in user, and (ii) the other user type is the mapping user type which may correspond to an existing user recorded in the system prior to token generation, or it may correspond to a newly generated user. A JSON Web Token is one type of token and used in some embodiments of the present invention. Here is code for selecting an algorithm for signature:

```
public static String createToken( ) {
    SignatureAlgorithm signatureAlgorithm =
    SignatureAlgorithm.RS256;
```

Code for generating a key will now be set forth:

```
// Create a legitimate RSA public and private key pair:
KeyPair kp = RsaProvider.generateKeyPair( );
PublicKey publicKey = kp.getPublic( );
PrivateKey privateKey = kp.getPrivate( );
```

Some code for generating token information will now be set forth.

```
Map<String, Object> claims = new HashMap<String, Object>( );
claims.put("username", "zosmfad");
claims.put("mapuser", "C1, C2, C3, N");
claims.put("role", "admin");
```

Code for generating token(s) according to the algorithm and the key will now be set forth:

```
JwtBuilder builder = Jwts.builder( ) .setClaims(claims)
    .setId("tokenid")
    .setIssuedAt(new Date( ))
    .setExpiration(new
    Date(System.currentTimeMillis( )+10*60*1000))
    .signWith(signatureAlgorithm.RS256, privateKey);
    Some concluding code will now be set forth:
    return builder.compact( );
}
```

Some embodiments of the present invention may include one, or more, of the following operations, features, characteristics and/or advantages: (i) developers and security testers could save many times by avoiding to take duplicate actions; (ii) when performing security tests, and the like, for all products like WebSphere and restful API, testers could omit creating several different permission users; (iii) when performing security tests, or the like, on a given user interface that is under development, if testers forget do one function test for before authorization user account, he or she needs to log out from current user and re-login before user account, testers could omit doing the login and logout actions again and again and reduce the mistakes generated by these routine, and time-consuming, actions; (iv) they could only login on time with highest permission user, and then do test with specific permission token; (v) reduces system rubbish and data redundancy; and/or (vi) can be used directly by all web products which use token mechanism.

In further regard of item (ii) in the list in the foregoing paragraph, some embodiments of the present invention create several identities for a single user, which is, in some respects similar to creating multiple users to correspond to a single software tester. However, if there are several different users, then the software tester still needs to repeat the login/logout process to finish the authorization test, which is an unnecessary expenditure of effort and time for the software tester, which can be avoided through the use of some embodiments of the present invention. Through the feature of having different tokens generated for the same software tester, the software tester can select a token with a certain access power to do the authorization test with a single login/logout action, and thereby avoid repeat login/logout actions.

Some embodiments of the present invention may include one, or more, of the following operations, features, characteristics and/or advantages: (i) redesigned data structure for token; (ii) uses a "Dichotomy algorithm way of thinking" to reduce the system workload and resource consumption; (iii) makes security test and development more efficient and/or effective; (iv) the life cycle of a generated virtual user is same with token; (v) mappings to identities of users can be generated for real users existing in system, meaning that no need extra data information needs to be cached for the group; and/or (vi) makes different users for every different resource which is more likely to do a customization authorization for situations where there are a relatively large number of resources (for example, hundreds of thousands of resources).

Some embodiments of the present invention may include one, or more, of the following operations, features, characteristics and/or advantages: (i) uses an improved session token as a unique identifier of an interaction session; (ii) improves on currently conventional tokens by adding more information which not only includes client user's information, but also includes mapping user's information; and/or (iii) as the client user could have several authority, such as read write and execute, once the authorization for client user is passed, server will generate relevant numbers of different single authorization tokens by mapping to different mapping users.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

Set of thing(s): does not include the null set; "set of thing(s)" means that there exist at least one of the thing, and possibly more; for example, a set of computer(s) means at least one computer and possibly more.

What is claimed is:

1. A computer-implemented method (CIM) for use with a database computer system including a database data set that includes machine readable data in the form of a plurality of records, the CIM comprising:
defining a plurality of sets of permission rule(s), with each set of permission rule(s) reflecting a different combination of privileges with respect to data of the database data set;
receiving a first user profile for a first user;
establishing a plurality of user identities to the first user;
generating a plurality of tokens, with each token being formed and structured to provide access according to a respectively corresponding set of permission rule(s) of the plurality of sets of permission rule(s); and
for each given user identity of the first user, adding a given token of the plurality of tokens to the first user profile and associating the given user identity and the given token.

2. The CIM of claim 1 further comprising:
authenticating the first user to log the first user into a first session of access to the database data set of the database computer system;
selecting, for the first user, a first user identity of the plurality of user identities, with the first user identity being associated with a first token of the plurality of tokens, and with the first token reflecting a first set of permission rule(s) of the plurality of permission rule(s);
using, by the first user, the first token to access the database data set in a manner enabled and/or constrained by the first set of permission rule(s); and
subsequent to the use of the first token:
selecting, for the first user, a second user identity of the plurality of user identities, with the second user identity being associated with a second token of the plurality of tokens, and with the second token reflecting a second set of permission rule(s) of the plurality of permission rule(s), and
using, by the first user, the second token to access the database data set in a manner enabled and/or constrained by the first set of permission rule(s).

3. The CIM of claim 2 wherein:
the computer implemented method is implemented in a security intelligence and event management computer system (SIEMCS);
the first user is a developer; and the use of the first and second tokens, by the first user, is performed for the purpose of simulating runtime users with different database access permission sets.

4. The CIM of claim 1 wherein at least one of the tokens of the plurality of tokens can be used only X number of times, where X is an integer greater than zero.

5. The CIM of claim 3 where X is equal to unity.

6. The CIM of claim 1 wherein the different sets of permission rules are different from each other in at least one of the following ways: (i) different level of read access (if any), (ii) different level of write access (if any); (iii) different level of ability to delete data of the database data set, (iv) different level of ability to revise data of the records of the database data set, (v) different level of ability to add data to existing records of the database data set, (vi) different level of ability to add new records of the database data set, (vii) different levels of one or more of the foregoing types of access with respect to different records of the database data set, and/or (viii) different levels of one or more of the foregoing types of access with respect to different fields of the records of the database data set.

7. A computer program product (CPP) for use with a database computer system including a database data set that includes machine readable data in the form of a plurality of records, the CPP comprising:
a set of storage device(s); and
computer code stored collectively in the set of storage device(s), with the computer code including data and instructions to cause a processor(s) set to perform at least the following operations:
defining a plurality of sets of permission rule(s), with each set of permission rule(s) reflecting a different combination of privileges with respect to data of the database data set,
receiving a first user profile for a first user,
establishing a plurality of user identities to the first user,
generating a plurality of tokens, with each token being formed and structured to provide access according to a respectively corresponding set of permission rule(s) of the plurality of sets of permission rule(s), and
for each given user identity of the first user, adding a given token of the plurality of tokens to the first user profile and associating the given user identity and the given token.

8. The CPP of claim 7 wherein the computer code further includes instructions for causing the processor(s) set to perform the following operation(s):
authenticating the first user to log the first user into a first session of access to the database data set of the database computer system;
selecting, for the first user, a first user identity of the plurality of user identities, with the first user identity being associated with a first token of the plurality of tokens, and with the first token reflecting a first set of permission rule(s) of the plurality of permission rule(s);
using, by the first user, the first token to access the database data set in a manner enabled and/or constrained by the first set of permission rule(s); and
subsequent to the use of the first token:
selecting, for the first user, a second user identity of the plurality of user identities, with the second user identity being associated with a second token of the plurality of tokens, and with the second token reflecting a second set of permission rule(s) of the plurality of permission rule(s), and
using, by the first user, the second token to access the database data set in a manner enabled and/or constrained by the first set of permission rule(s).

9. The CPP of claim 8 wherein:
the computer implemented method is implemented in a security intelligence and event management computer system (SIEMCS);
the first user is a developer; and
the use of the first and second tokens, by the first user, is performed for the purpose of simulating runtime users with different database access permission sets.

10. The CPP of claim 7 wherein at least one of the tokens of the plurality of tokens can be used only X number of times, where X is an integer greater than zero.

11. The CPP of claim 9 where X is equal to unity.

12. The CPP of claim 7 wherein the different sets of permission rules are different from each other in at least one of the following ways: (i) different level of read access (if any), (ii) different level of write access (if any); (iii) different level of ability to delete data of the database data set, (iv) different level of ability to revise data of the records of the database data set, (v) different level of ability to add data to existing records of the database data set, (vi) different level of ability to add new records of the database data set, (vii) different levels of one or more of the foregoing types of access with respect to different records of the database data set, and/or (viii) different levels of one or more of the foregoing types of access with respect to different fields of the records of the database data set.

13. A computer system (CS) for use with a database computer system including a database data set that includes machine readable data in the form of a plurality of records, the CS comprising:
a processor(s) set;
a set of storage device(s); and
computer code stored collectively in the set of storage device(s), with the computer code including data and instructions to cause the processor(s) set to perform at least the following operations:
defining a plurality of sets of permission rule(s), with each set of permission rule(s) reflecting a different combination of privileges with respect to data of the database data set,
receiving a first user profile for a first user,
establishing a plurality of user identities to the first user,
generating a plurality of tokens, with each token being formed and structured to provide access according to a respectively corresponding set of permission rule(s) of the plurality of sets of permission rule(s), and
for each given user identity of the first user, adding a given token of the plurality of tokens to the first user profile and associating the given user identity and the given token.

14. The CS of claim 13 wherein the computer code further includes instructions for causing the processor(s) set to perform the following operation(s):
authenticating the first user to log the first user into a first session of access to the database data set of the database computer system;
selecting, for the first user, a first user identity of the plurality of user identities, with the first user identity being associated with a first token of the plurality of tokens, and with the first token reflecting a first set of permission rule(s) of the plurality of permission rule(s);
using, by the first user, the first token to access the database data set in a manner enabled and/or constrained by the first set of permission rule(s); and subsequent to the use of the first token:
  selecting, for the first user, a second user identity of the plurality of user identities, with the second user identity being associated with a second token of the plurality of tokens, and with the second token reflecting a second set of permission rule(s) of the plurality of permission rule(s), and
  using, by the first user, the second token to access the database data set in a manner enabled and/or constrained by the first set of permission rule(s).

15. The CS of claim 14 wherein:
the computer implemented method is implemented in a security intelligence and event management computer system (SIEMCS);
the first user is a developer; and
the use of the first and second tokens, by the first user, is performed for the purpose of simulating runtime users with different database access permission sets.

16. The CS of claim 13 wherein at least one of the tokens of the plurality of tokens can be used only X number of times, where X is an integer greater than zero.

17. The CS of claim 15 where X is equal to unity.

18. The CS of claim 13 wherein the different sets of permission rules are different from each other in at least one of the following ways: (i) different level of read access (if any), (ii) different level of write access (if any); (iii) different level of ability to delete data of the database data set, (iv) different level of ability to revise data of the records of the database data set, (v) different level of ability to add data to existing records of the database data set, (vi) different level of ability to add new records of the database data set, (vii) different levels of one or more of the foregoing types of access with respect to different records of the database data set, and/or (viii) different levels of one or more of the foregoing types of access with respect to different fields of the records of the database data set.

* * * * *